US011828381B2

(12) United States Patent
Willers et al.

(10) Patent No.: US 11,828,381 B2
(45) Date of Patent: Nov. 28, 2023

(54) SWITCHING VALVE AND VALVE ARRANGEMENT WITH SUCH A SWITCHING VALVE FOR CONTROLLING A MASS FLOW

(71) Applicant: OTTO EGELHOF GmbH & Co. KG, Fellbach (DE)

(72) Inventors: Eike Willers, Stuttgart (DE); Andreas Auweder, Vaihingen (DE); Markus Lang-Belz, Fellbach (DE)

(73) Assignee: OTTO EGELHOF GmbH & Co. KG, Fellbach (DE)

( * ) Notice: Subject to any disclaimer, the term of this patent is extended or adjusted under 35 U.S.C. 154(b) by 11 days.

(21) Appl. No.: 17/519,697

(22) Filed: Nov. 5, 2021

(65) Prior Publication Data

US 2022/0154843 A1    May 19, 2022

(30) Foreign Application Priority Data

Nov. 13, 2020 (DE) .................. 10 2020 129 993.1

(51) Int. Cl.
*F16K 31/06* (2006.01)
*F16K 31/40* (2006.01)
*F25B 41/20* (2021.01)

(52) U.S. Cl.
CPC ........ *F16K 31/406* (2013.01); *F16K 31/0675* (2013.01); *F25B 41/20* (2021.01)

(58) Field of Classification Search
CPC .... F16K 31/406; F16K 31/0675; F16K 27/08; F16K 1/00; F16K 27/0272; F16K 27/029;
(Continued)

(56) References Cited

U.S. PATENT DOCUMENTS 3,262,027 A * 7/1966 Zaleske .................. H01F 7/10
251/129.15
6,362,717 B1 * 3/2002 Lewin .................... H01F 7/081
336/83
(Continued)

FOREIGN PATENT DOCUMENTS

DE          3202704 A  *  8/1982
DE          3202704 A1     8/1982
(Continued)

OTHER PUBLICATIONS

European Search Report dated Apr. 11, 2022 in European Patent Application No. 21206587, the corresponding European patent application to the present application.
(Continued)

*Primary Examiner* — Marina A Tietjen
(74) *Attorney, Agent, or Firm* — KRIEGSMAN & KRIEGSMAN

(57) ABSTRACT

A switching valve and a valve arrangement for regulating a mass flow in a refrigeration or heating circuit, having a path-generating device which comprises a U-shaped yoke with an upper and lower leg which are aligned with one another and a coil which is positioned within the yoke and can be electrically controlled, a core fixedly positioned relative to the coil and having at least a portion projecting relative to the coil and positioned in an opening in the leg of the yoke, and a tappet provided in the coil and movable relative to the core and having an end extending through an opening in one of the legs of the yoke, with a closing body or valve closing member arranged on the tappet, and with a restoring element which is arranged between the core and the tappet, a switching bushing being provided which is insertable into the path-generating device, and which is closed on one side by a base and is open on the opposite end of the base and fastening section is assigned to the open end
(Continued)

Figure 1:
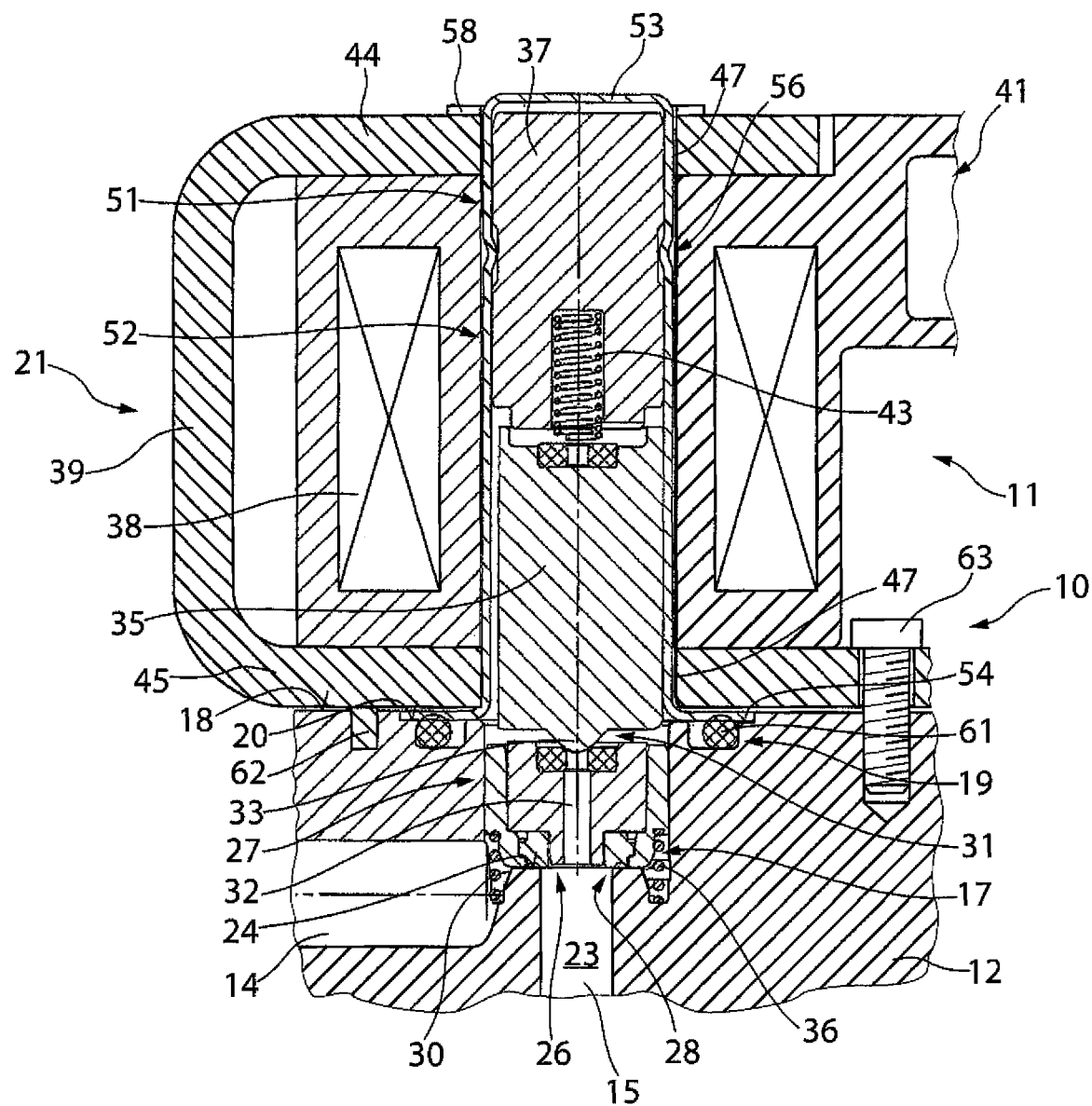

of the switching bushing has a core-tappet section with a cylindrical lateral surface extending between the base and the fastening section and in which at least the core is received and the tappet is guided and the fastening section opposite the base has at least one circumferential shoulder or circumferential collar directed outwardly relative with respect to the core-tapped-section.

18 Claims, 13 Drawing Sheets

(58) Field of Classification Search
CPC ...... F16K 31/0655; F16K 31/40; F16K 31/42; F25B 41/20; F25B 41/325; F25B 2341/067; F25B 41/345; B60T 8/363; B60H 1/00485
See application file for complete search history.

(56) References Cited

U.S. PATENT DOCUMENTS

| | | | |
|---|---|---|---|
| 2002/0079007 A1* | 6/2002 | Entwistle | F16K 31/0665 137/625.65 |
| 2004/0134548 A1 | 7/2004 | Koyama | |
| 2010/0147390 A1* | 6/2010 | Glaudel | F16K 31/0696 335/255 |
| 2013/0082199 A1* | 4/2013 | Matsumoto | F16K 31/0655 251/129.07 |
| 2016/0169407 A1 | 6/2016 | Aguilar et al. | |

FOREIGN PATENT DOCUMENTS

| | | | | |
|---|---|---|---|---|
| DE | 19922334 A1 | | 9/2000 | |
| DE | 69917246 T2 | | 5/2005 | |
| DE | 102004049790 A1 | | 7/2005 | |
| DE | 102006020334 A1 | | 7/2008 | |
| DE | 102013107060 A1 | | 1/2015 | |
| DE | 102017201453 A1 | * | 8/2018 | |
| DE | 102018215493 A1 | * | 3/2020 | |
| EP | 1203917 A2 | * | 5/2002 | ......... F16K 31/0689 |
| IT | UA20161659 A1 | | 8/2017 | |
| WO | WO-9951901 A1 | * | 10/1999 | ......... F16K 31/0658 |

OTHER PUBLICATIONS

European Search Opinion dated Apr. 26, 2022 in European Patent Application No. 21206587, the corresponding European patent application to the present application (together with machine translation).

* cited by examiner

SWITCHING VALVE AND VALVE ARRANGEMENT WITH SUCH A SWITCHING VALVE FOR CONTROLLING A MASS FLOW

This application claims priority of German Application No. 10 2020 129 993.1 filed Nov. 13, 2020, which is hereby incorporated herein by reference in its entirety.

The invention relates to a switching valve and to a valve arrangement for controlling a switching valve in a refrigeration or heating circuit comprising such a switching valve.

From DE 10 2013 107 060 A1 a valve arrangement for a switching valve for controlling a mass flow in a refrigeration or heating circuit is known. This valve arrangement comprises a valve housing, which has a supply opening and a discharge opening, and a tappet, on which a valve closing member is provided, which, in a closed position, bears against a valve seat of a through-hole provided between the supply opening and the discharge opening and closes the through-hole. A guide bushing is screwed into a valve body, which comprises an armature tube. In this armature tube, a tappet is movably guided up and down and a core is fixedly held thereto. A coil of a path generating device surrounds the armature tube. The coil is in turn surrounded by a yoke. In this arrangement of the switching valve, it is necessary that the core is fixed in the armature tube by a gas-tight soldered joint, this soldered joint being designed in such a way that the path-generating device with the coil and the yoke surrounding the coil can subsequently be placed on the core and the armature tube.

The invention is based on the object of proposing an arrangement for a switching valve as well as a valve arrangement with a switching valve, by which a cost reduction is made possible.

This object is solved by a switching valve in which a switching bushing is provided which can be inserted into the path-generating device, is closed on one side by a base and has an open end opposite the base on which open end the fastening section is provided, and the switching bushing has a core-tappet section in which the core is received and the tappet is guided. The switching bushing comprises on one end the base to close the switching bushing and opposite to the base an open end having a fastening section, which is provided as a circumferential collar or as a circumferential shoulder directed outwardly with respect to the core-tappet-section. This embodiment of the switching bushing has the advantage of providing an arrangement, which is closed on one side. A gas-tight welded connection or gas-tight soldered connection between the core and the switching bushing after insertion of the tappet is not required. By means of this switching bushing, an outwardly closed arrangement can be provided after positioning of the switching valve to a valve housing, which has a high tightness. The switching bushing is provided open to an connection side.

This provides additionally a simple geometry for the switching bushing, which is also attachable to a valve housing in a simple manner.

Preferably, the switching bushing extends through an opening in the upper and lower legs of the yoke and through the coil. This closed arrangement can be inserted into the path generating device in a simple manner. Moreover, this embodiment of the switching bushing still maintains magnetic flux for rapid actuation of the tappet.

The base of the switching bushing is positioned in an opening of the upper or lower leg of the yoke or protrudes opposite an outer side of the yoke and is fixed to the yoke by a fastening element. Thereby, a clamping element, in particular a locking ring, may be provided to fix the switching bushing to the yoke. Furthermore, a screw connection or other clamping connection may also be provided.

Preferably, the core tappet section of the switching bushing has a constant diameter at least between the upper leg and the lower leg of the yoke. As a result, the core-tappet portion can include a guide portion for the movably received tappet. In addition, easy insertion into the path generating device is possible.

Preferably, the core is fixed in the switching bushing with at least one circumferential bead in the core-tappet section. This allows a simple and inexpensive fixation of the core in the switch bushing. A unilaterally closed arrangement of the switching bushing is thereby still maintained.

Furthermore, it is preferably provided that the switching bushing comprises a fastening section in which at least one radial peripheral surface adjoins the shoulder. An end face of the radial peripheral surface may be provided as a contact surface in the connection opening on the valve housing. Further, the radial peripheral surface may be provided within a port opening of the valve housing and may engage or be spaced from a radial peripheral wall. Furthermore, it may preferably be provided that this radial peripheral surface is adjoined by a further contact surface which is in turn oriented radially outwardly. As a result, an enlarged contact area can be provided compared to an end face of the radial peripheral surface. Depending on the geometry of the connection opening, the sealing element can be arranged inside or outside the fastening section of the switching bushing in order to seal the interface between the switching bushing and the connection opening.

A widened guide section for receiving a pilot valve may be provided between the core-tappet section and the fastening section of the switching bushing. This arrangement is particularly provided for a servo-controlled switching valve.

Preferably, an inner diameter of the widened guide section is formed with clearance to the outer periphery of the pilot valve. Tolerances may occur with respect to roundness during deep drawing or pressing of such switching bushings. Nevertheless, guidance of the pilot valve is provided by dimensioning the inner diameter of the widened guide section with a clearance fit to the outer circumference of the pilot valve.

At least the base, the core-tappet section and the fastening section of the switch bushing are formed integrally. This may allow for a closed arrangement and tightness to a valve housing. Preferably, the switching bushing is formed as a one-piece deep-drawn part or a one-piece stamped-bent part. Such deep-drawn parts or stamped-bent parts can be manufactured at low cost. Preferably, the switching bushing may be formed from stainless steel.

The object underlying the invention is further solved by a valve arrangement for controlling a mass flow in a refrigeration or heating circuit, in which a switching valve according to one of the embodiments described above is used, which is fixed to the valve housing by a fastening element of the switching bushing. Thereby, a simple arrangement and good sealing against the environment can be enabled, since a receiving area or a receiving opening on the valve housing for positioning the switching valve can be sealed in a simple manner by means of the fastening element.

Preferably, the fastening section of the switching bushing is positioned at or in a connection opening of the valve housing and at least one sealing element is positioned between a connection surface of the connection opening and the fastening section. Preferably, a ring seal, in particular an O-ring seal, is provided which is held clamped between the connection surface of the connection opening and the fastening portion.

Advantageously, the path generating device is connected to the valve housing by at least one connecting element, preferably a releasable connecting element, which engages outside the connection point on or in the valve housing towards which the switching bushing is aligned. This allows easy mounting and fixing outside the connection point of the switching bushing to the valve housing.

Alternatively, the path generating device may be connected to the valve body by at least one releasable connector positioned between the yoke of the path generating device and a mounting portion of the switch bushing. This may provide an integral or internal attachment.

With this integrated or internal attachment, the fastening element is preferably provided as a screw bushing or a threaded bushing, which engages in a thread in the connection opening. As a result, the fastening portion of the switching bushing can be moved towards and held fixed to a contact surface in the connection opening. Alternatively, the fastening element may be in the form of a flange plate, which, on the one hand, engages the fastening section of the switching bushing positioned in the connection opening and, on the other hand, is fixed outside the connection opening by a releasable fastening element.

The switching bushing of the switching valve may alternatively be insertable in a connection opening of a first half of the valve housing, which is fixed to a second half of the valve housing to the first half of the valve housing.

Furthermore, the switching valve is preferably designed as a direct switching valve, in which the tappet with the valve closing member is in direct contact with the valve seat in a closed position on the valve housing.

Alternatively, the switching valve can be designed as a servo valve with a pilot valve, whereby the pilot valve is arranged between the valve closing member and the tappet. Depending on the pressures and the requirements, both direct switching valves and switching valves designed as servo valves can be used.

Depending on the requirements of the refrigeration or heating circuit to be controlled, the switching valve can be designed as an NC (Normally Closed) valve, which is closed in the de-energised state, or as an NO (Normally Open) valve, which is open in the de-energised state.

Figure 2:
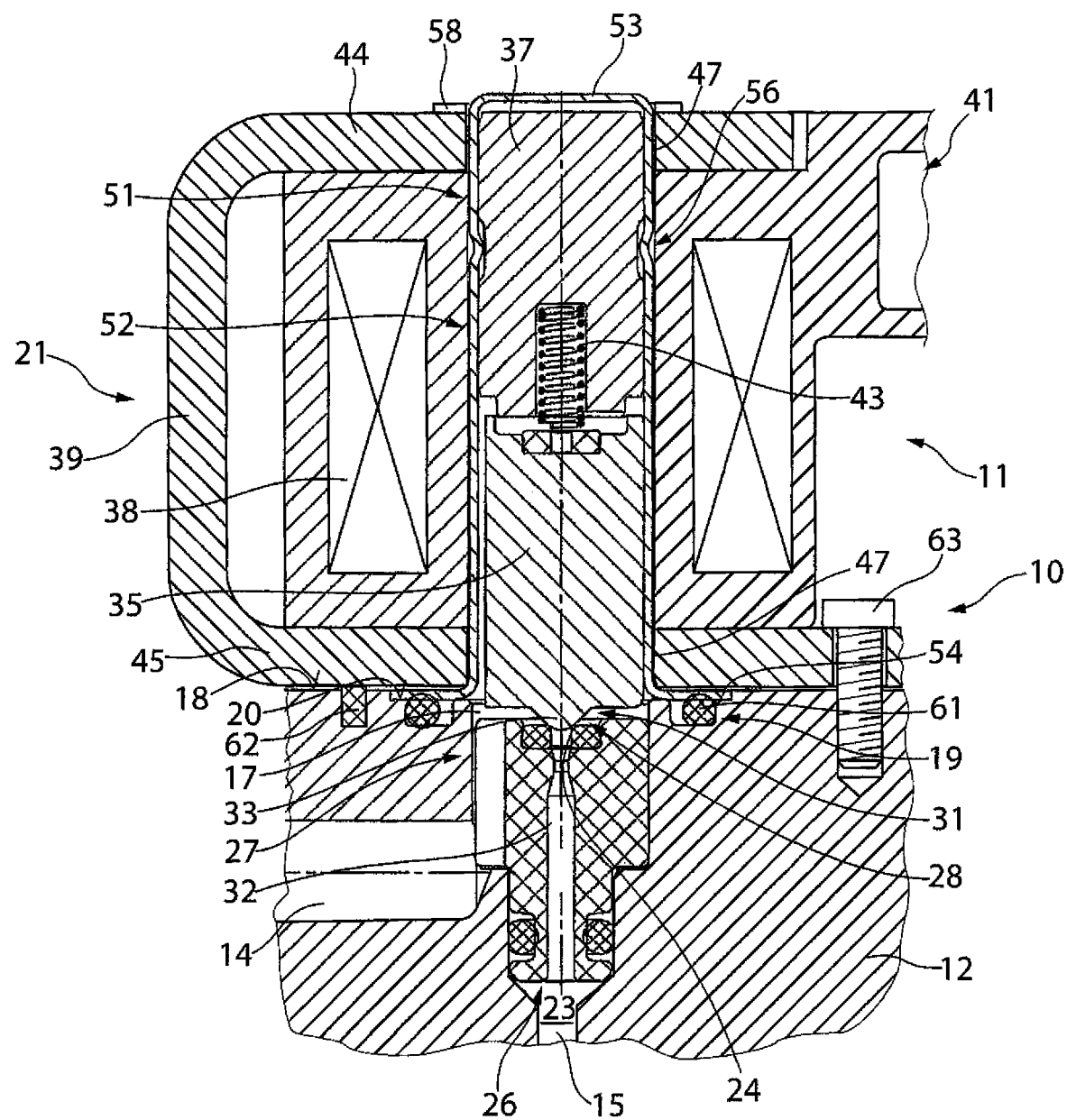
Figure 3:
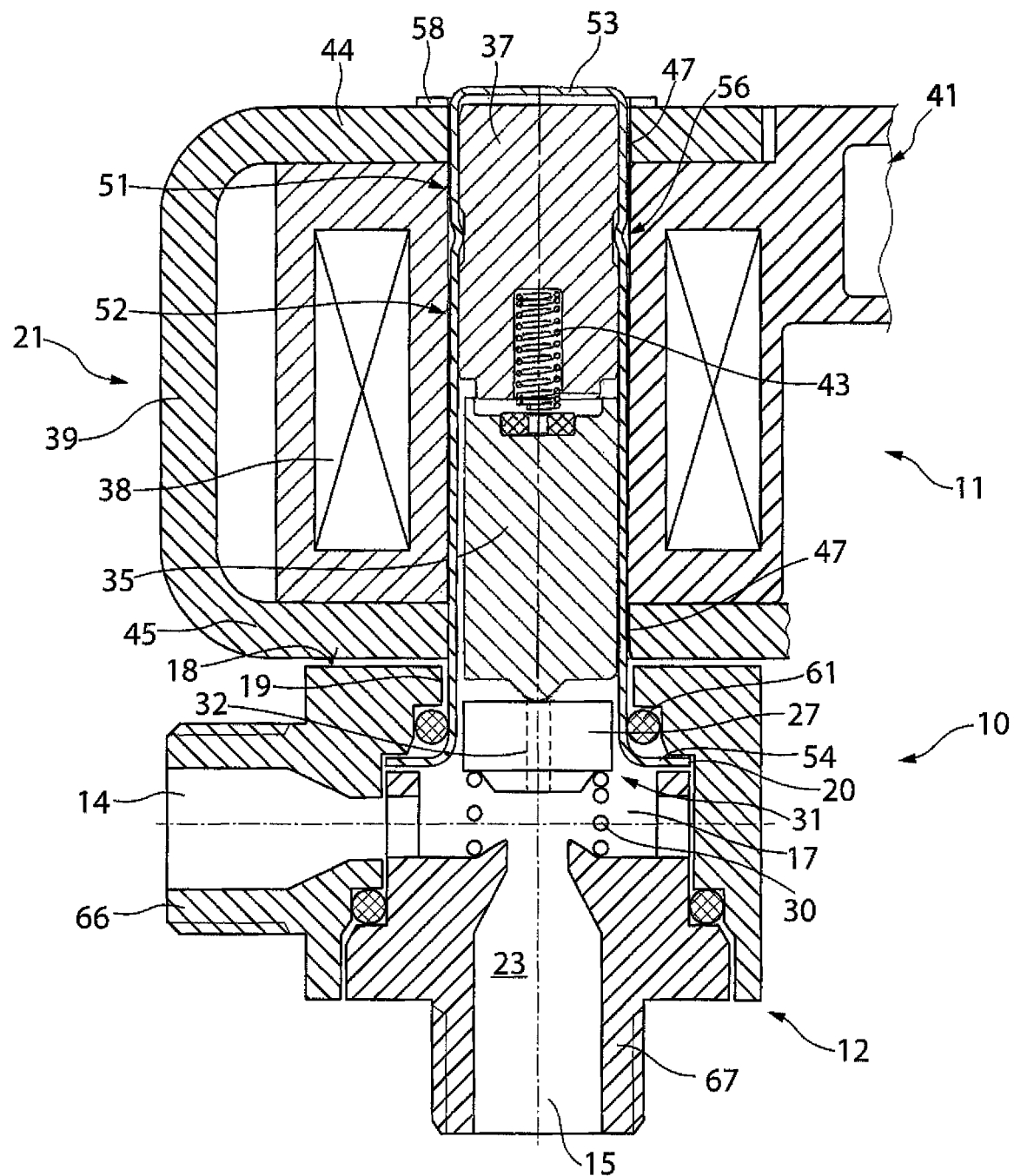
Figure 4:
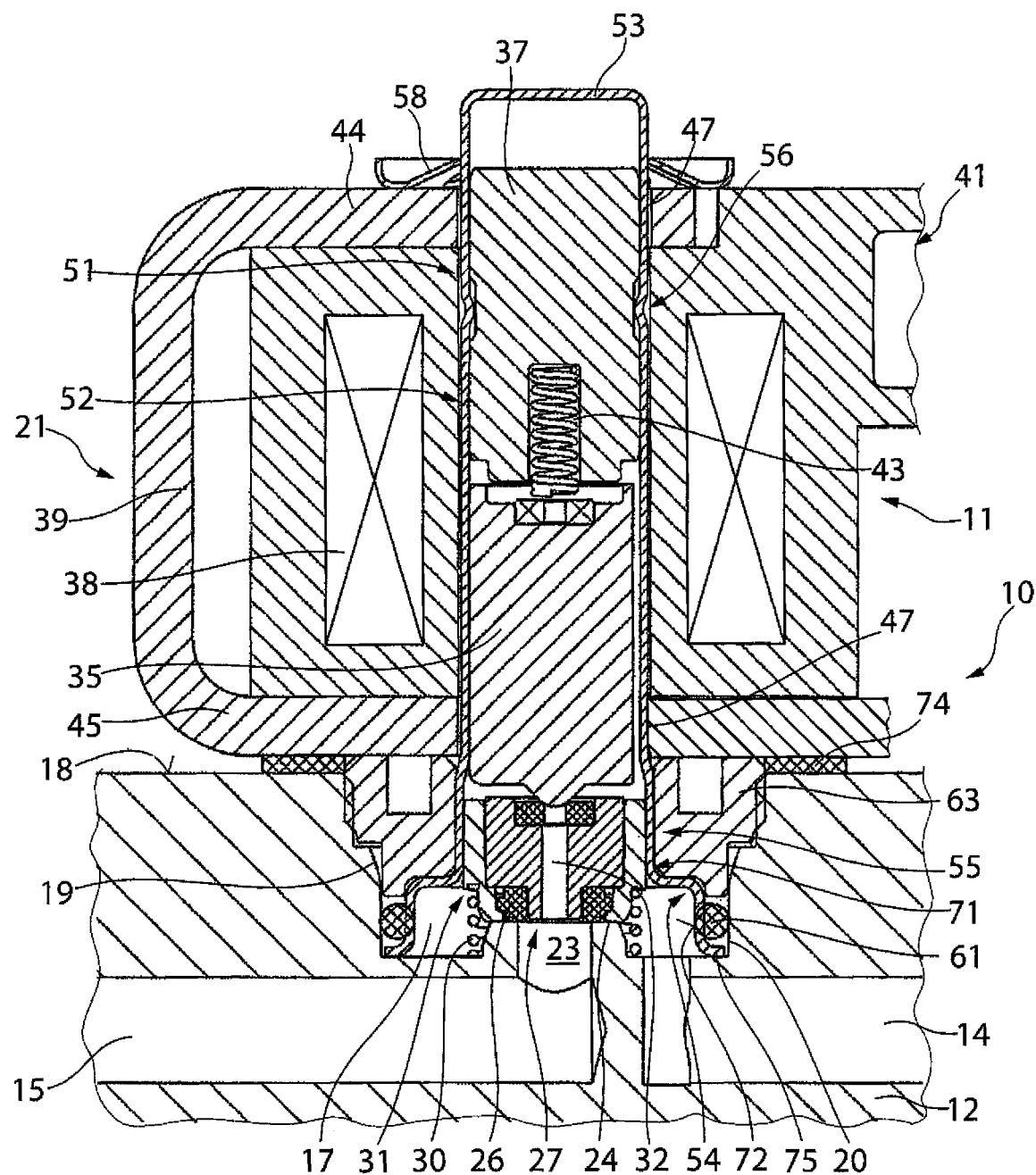
Figure 5:
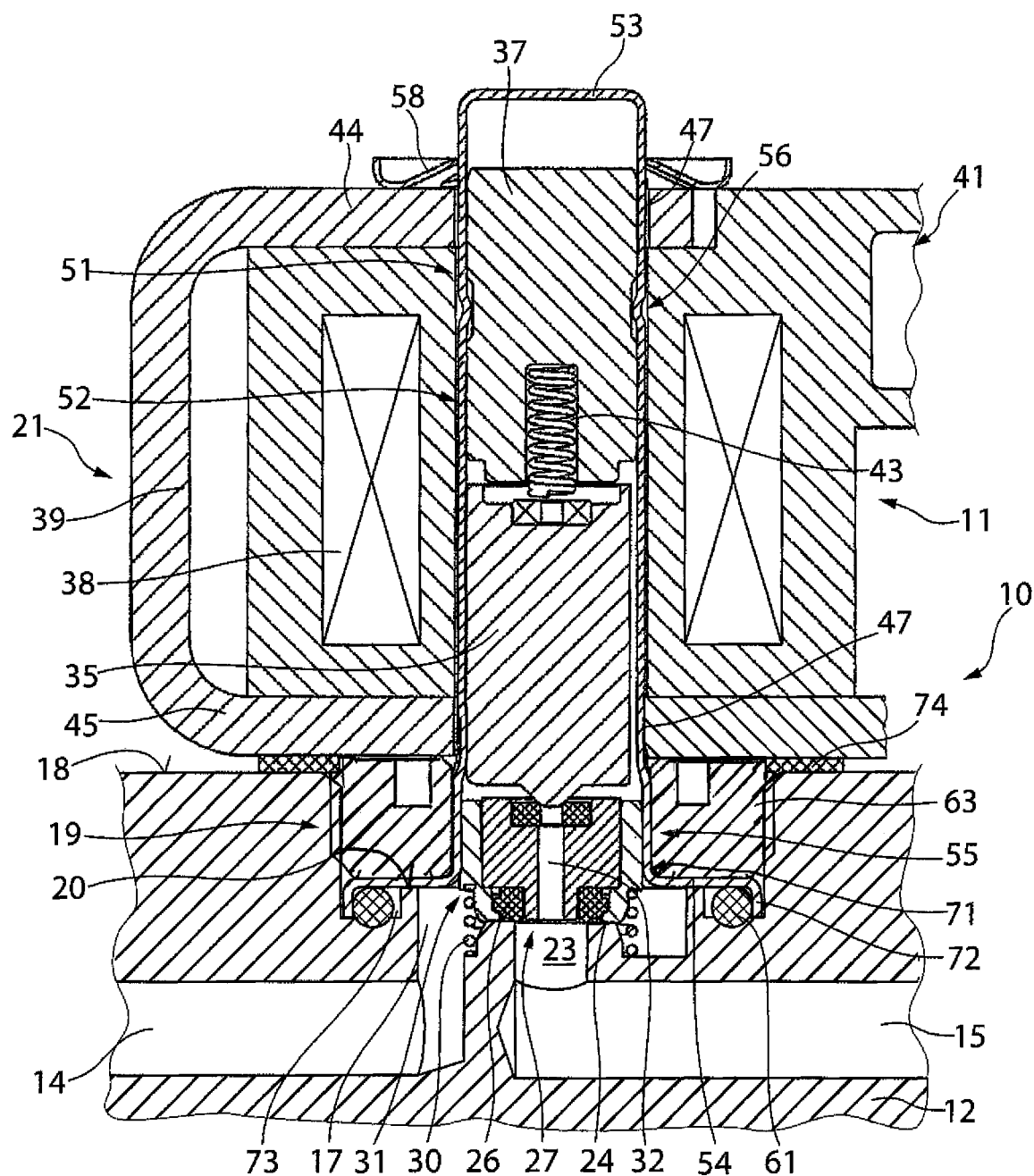
Figure 6:
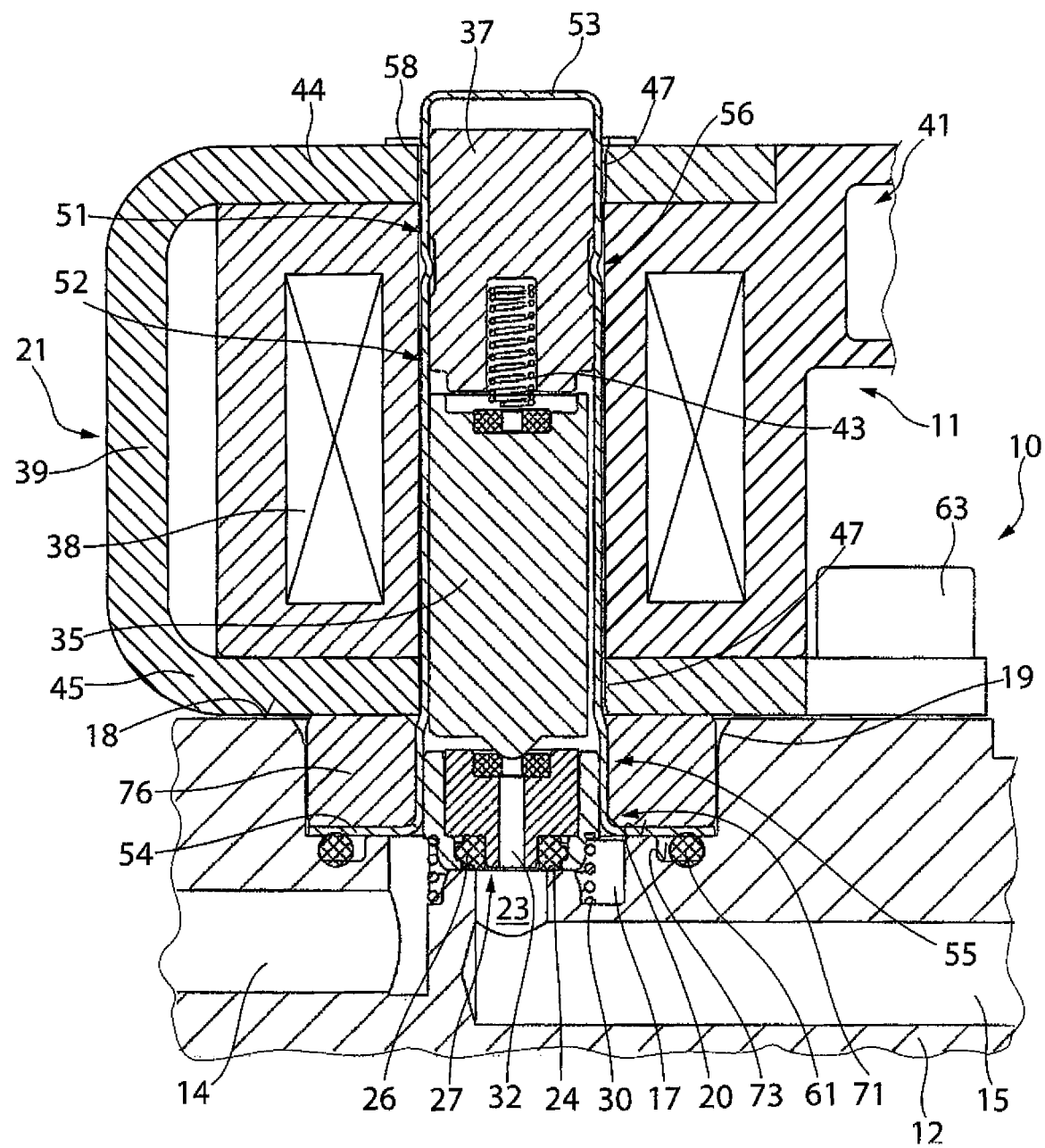
Figure 7:
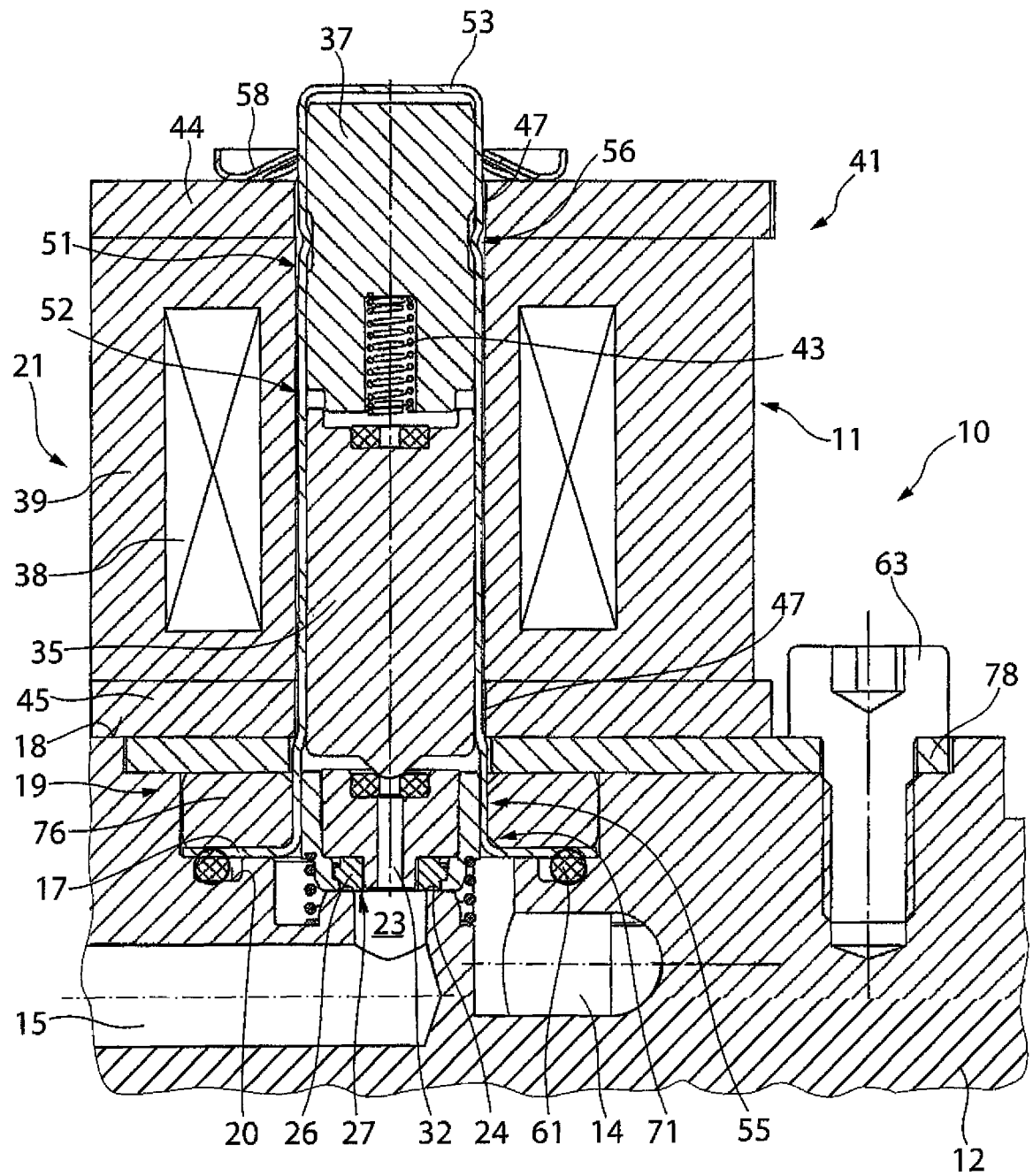
Figure 8:
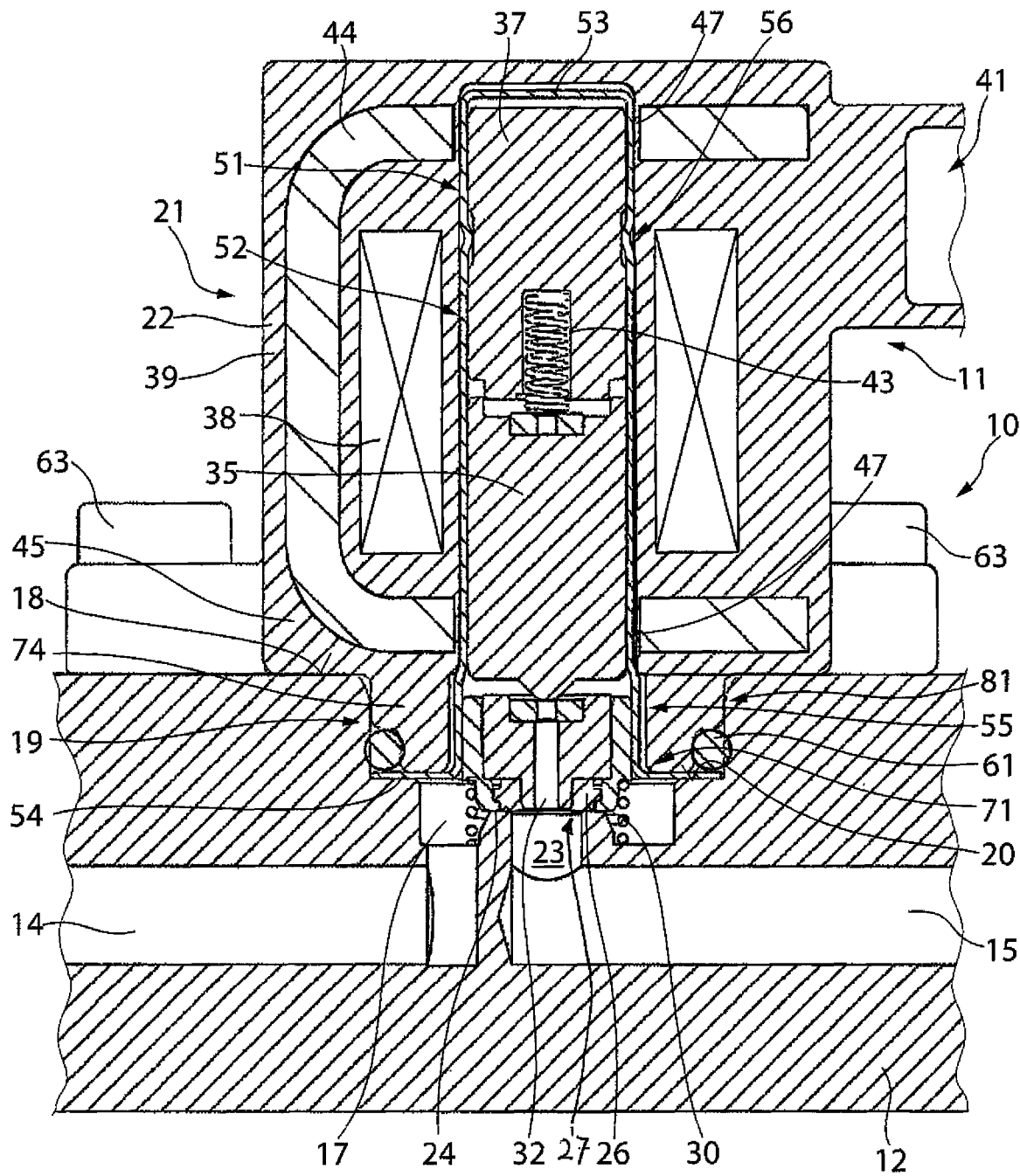
Figure 9:
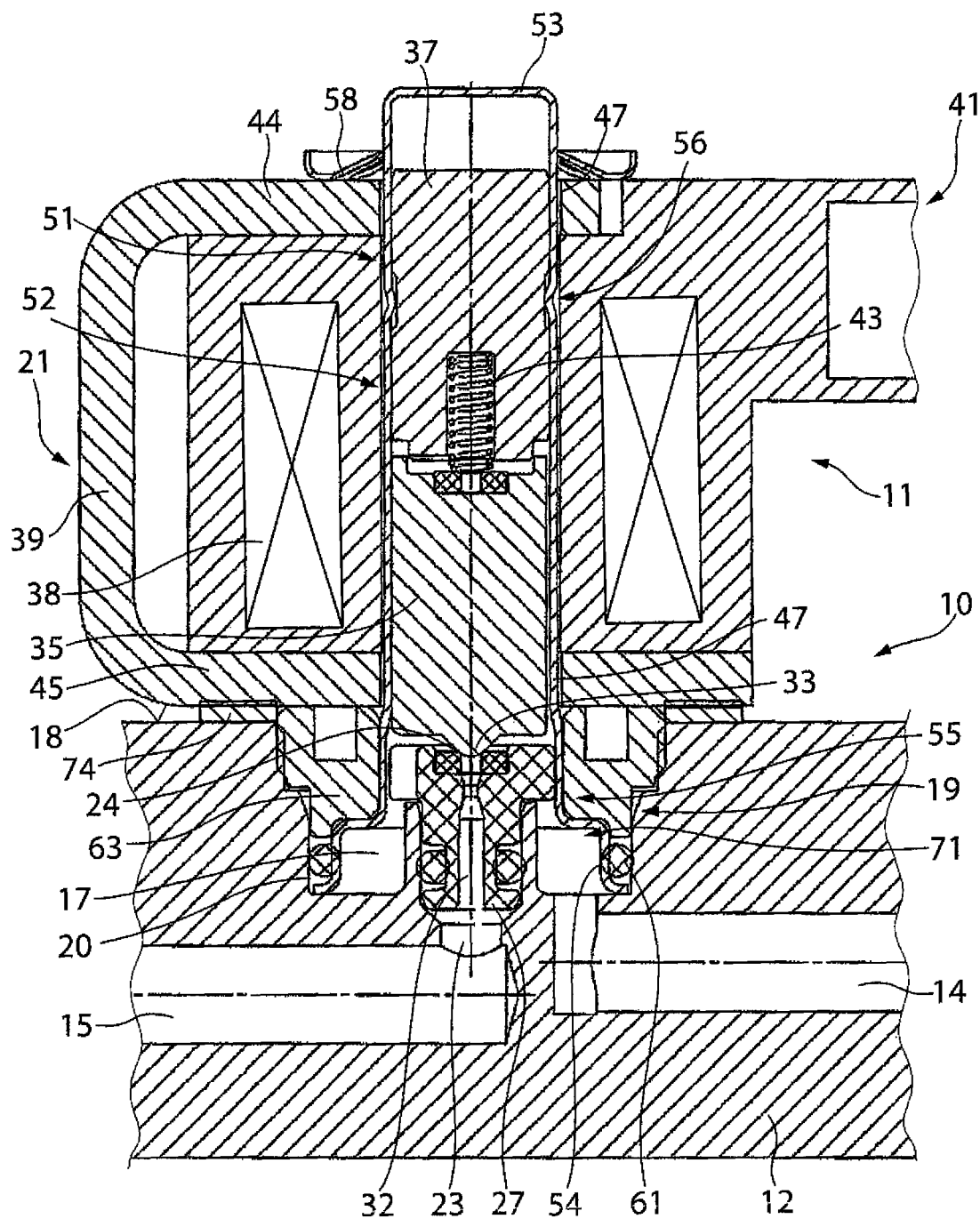
Figure 10:
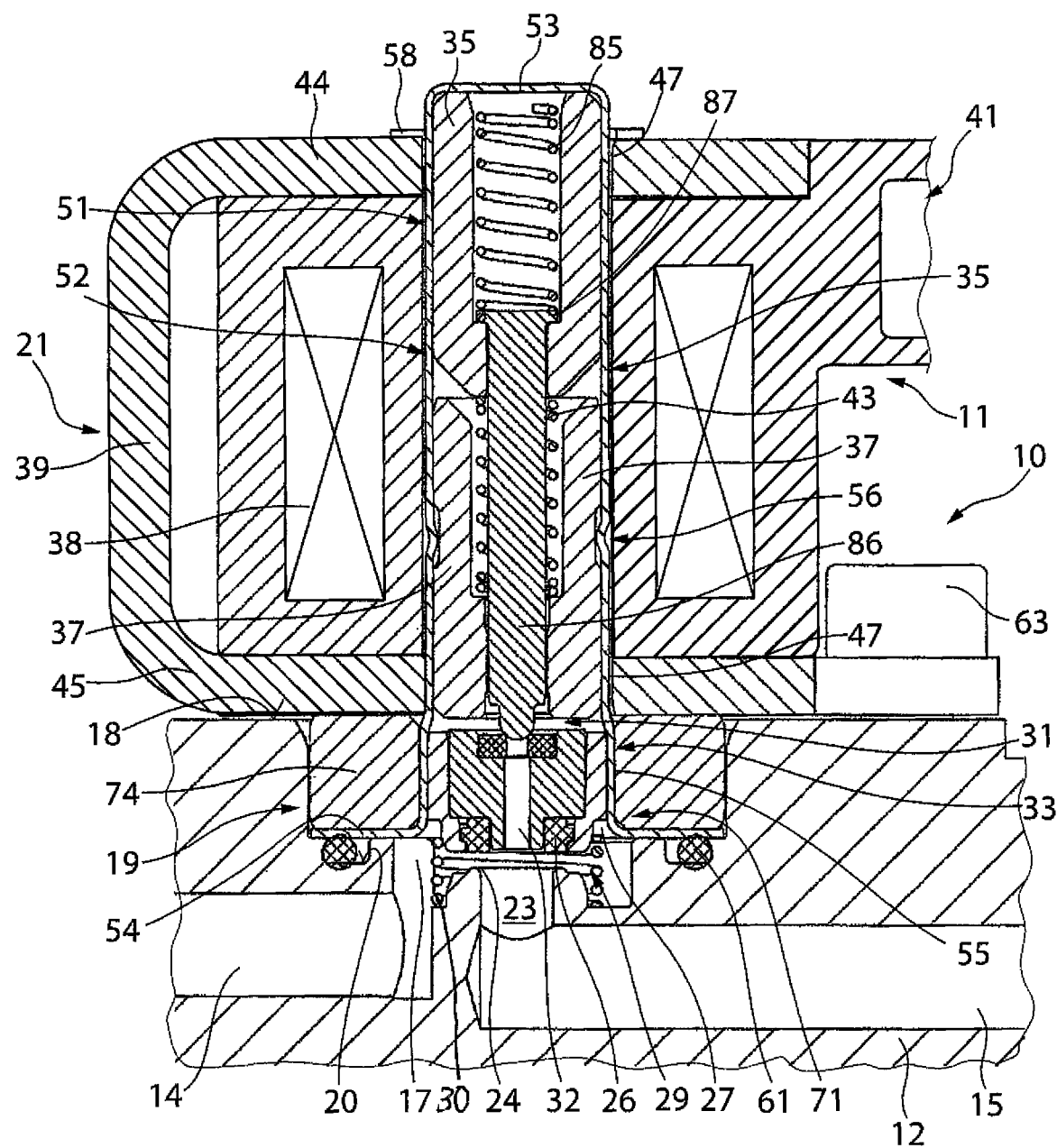
Figure 11:
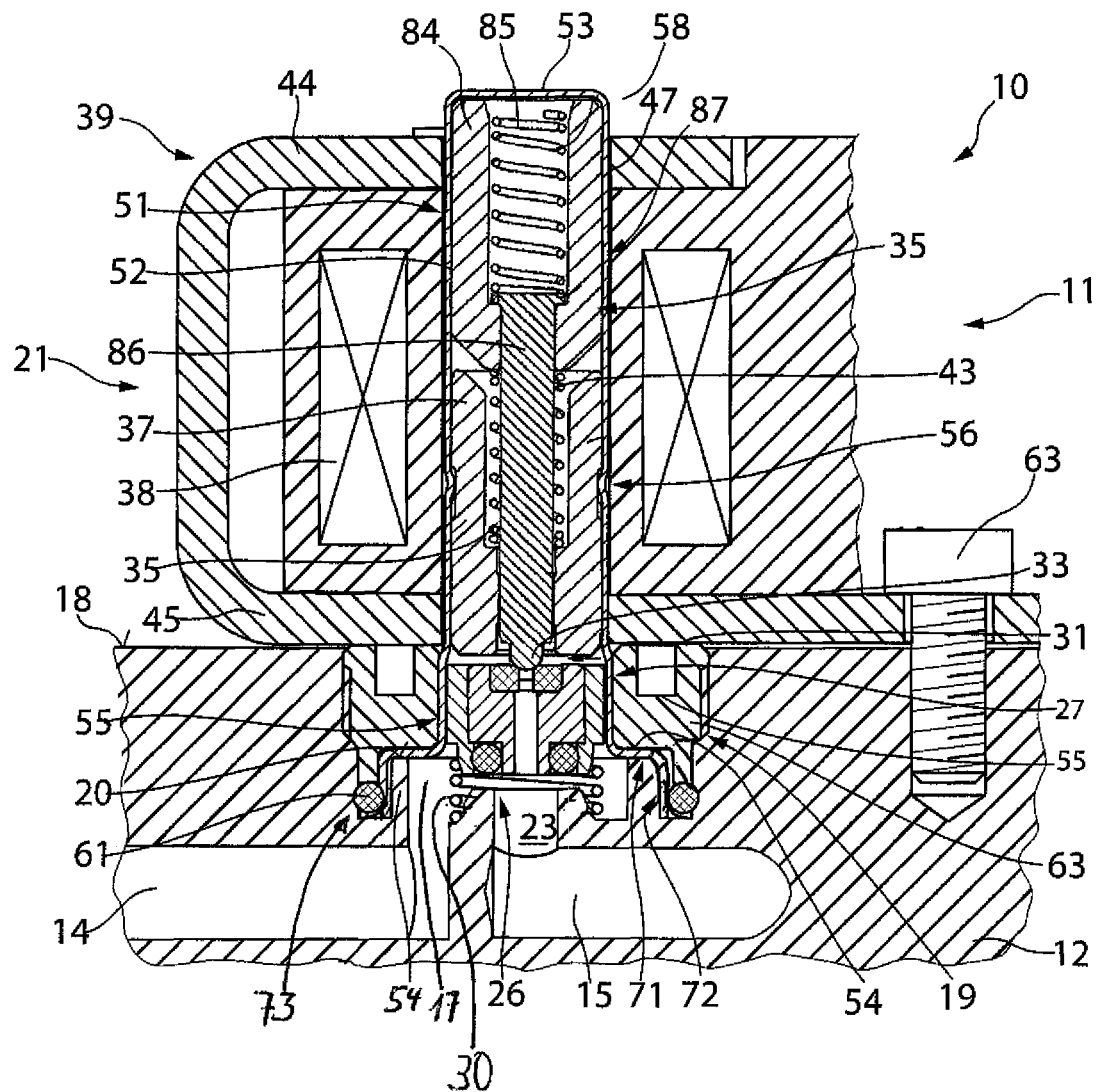
Figure 12:
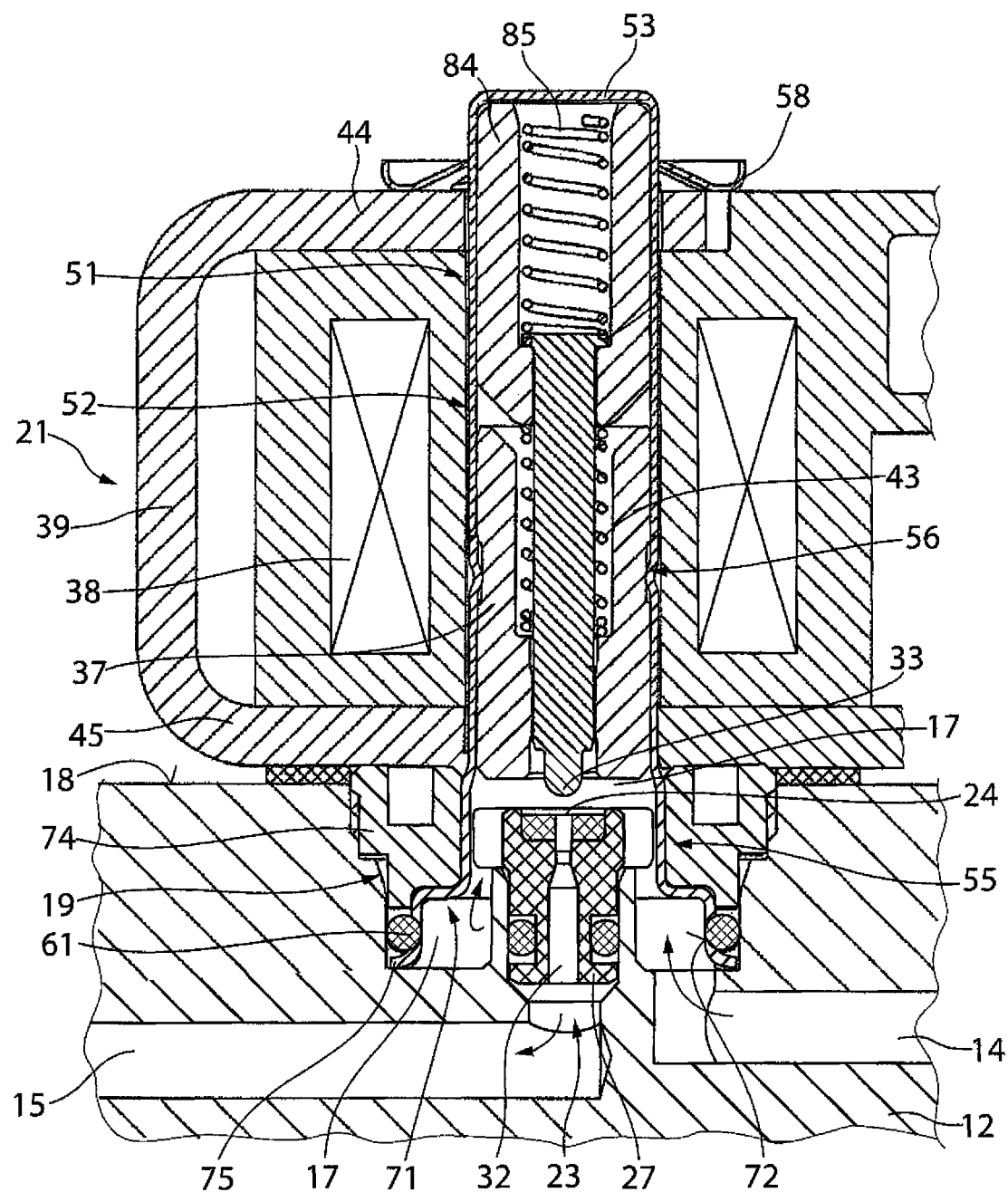
Figure 13:
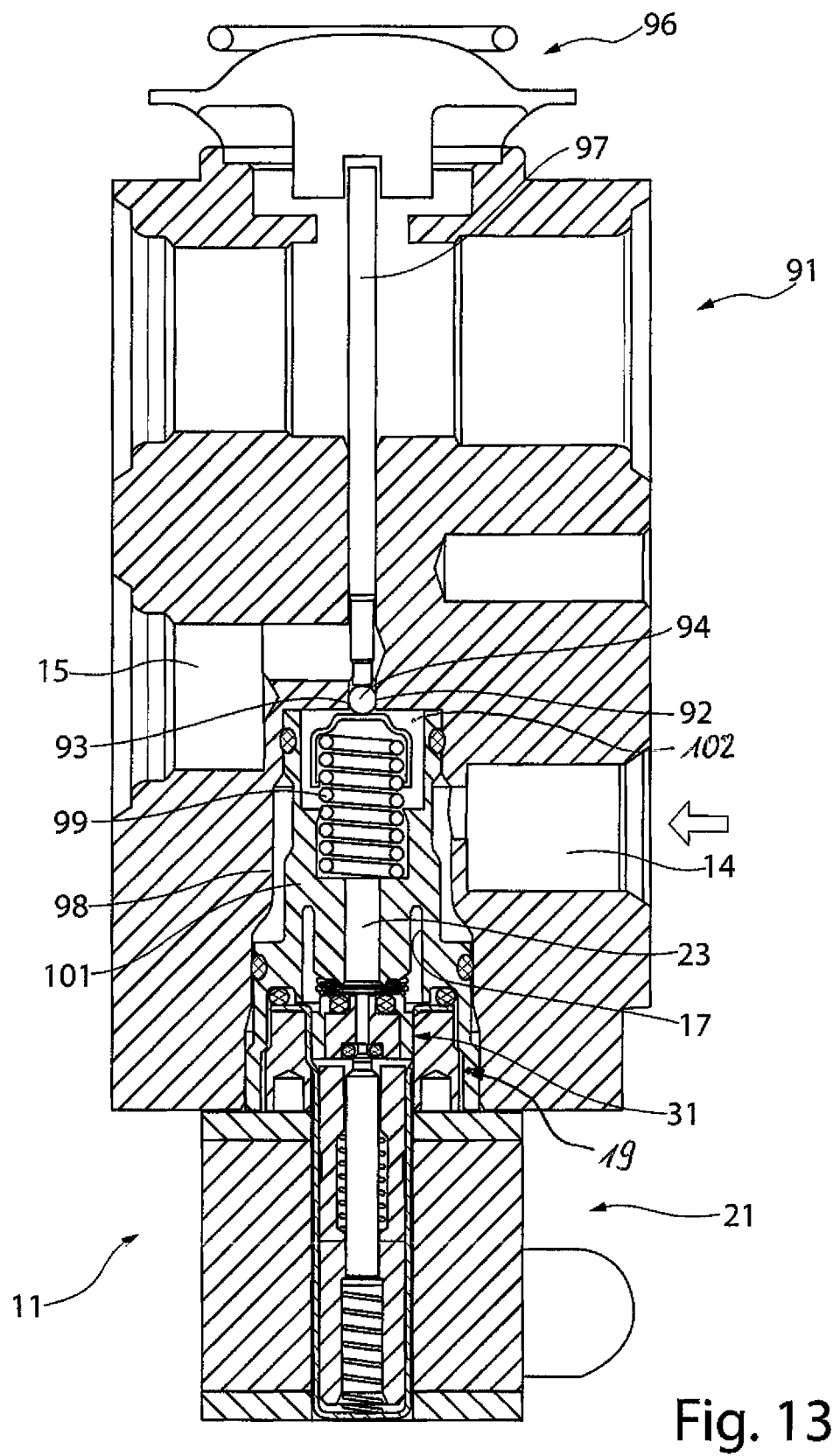

The invention and further advantageous embodiments and further embodiments thereof are described and explained in more detail below with reference to the examples shown in the drawings. The features to be taken from the description and the drawings can be applied individually or in any combination in accordance with the invention. Showing:

FIG. 1 a schematic view of a first embodiment of a valve arrangement with a servo-controlled switching valve as NC valve, FIG. 2 a schematic sectional view of a further valve arrangement with a switching valve as a direct switching valve as an NC valve, FIG. 3 a schematic sectional view of an alternative embodiment to FIG. 1, FIG. 4 a schematic sectional view of another servo-controlled switching valve as an NC valve, FIG. 5 a schematic sectional view of a further alternative embodiment of a servo-controlled switching valve as NC valve to FIG. 4, FIG. 6 a schematic sectional view of an alternative embodiment of the switching valve to FIG. 4, FIG. 7 a schematic sectional view of a further alternative embodiment to FIG. 4, FIG. 8 a schematic sectional view of a further alternative embodiment to FIG. 4, FIG. 9 a schematic sectional view of a switching valve as a direct switching NC valve, and FIG. 10 a schematic sectional view of a servo-controlled NO valve, and FIG. 11 a schematic sectional view of a further alternative embodiment of the switching valve as an NO valve, FIG. 12 a schematic sectional view of a further alternative embodiment of the switching valve as an NO valve to FIG. 11, and FIG. 13 a schematic sectional view of a further alternative embodiment to FIG. 10.

FIG. 1 shows a schematic sectional view of a first embodiment of a switching valve 11. This switching valve 11 is connected to a valve housing 12 and forms a valve arrangement 10 with the latter. The valve housing 12 comprises a feed opening 14 for a mass flow and a discharge opening 15 as well as a chamber 17 connecting the feed opening 14 and the discharge opening 15. The feed opening 14 and the discharge opening 15 each have connections for supply lines or further components in order to integrate this valve arrangement 10 into a refrigeration circuit or heating circuit.

The chamber 17 is part of a connection opening 19 on the valve housing 12, which is open towards a housing side 18. The chamber 17 merges into a through bore 23, which is surrounded by a valve seat 24. This switching valve 11 is formed as a servo valve. This servo valve comprises a valve piston 27 having a valve closing member 26, which abuts against the valve seat 24 in a closing position 28. The valve piston 27 is guided in the connection opening 19 of the valve housing 12. Opposite the valve closing member 26, the valve piston 27 has a pilot bore 32, which is closable by closing body 33 arranged on a tappet 35. The pilot bore 32 and the closing body 33 form the pilot valve 31. A path generating device 21 is detachably attached to the valve body 12 and aligned with the connection opening 19. The path generating device 21 includes a coil 38, which is incorporated into a yoke 39. This yoke 39 includes upper and lower legs 44, 45, each of which includes an opening 47 corresponding to the internal passageway of the coil 38. The coil 38 and the yoke 39 are connected to each other or are arranged together in a housing. This housing may also be an injection molded part surrounding the coil 38 and the yoke 39. The path generating device 21 is controllable via an electrical connection 41. A switching bushing 51 is insertable into the path generating device 21. This switching bushing 51 includes a core-tappet section 52, which includes preferably at least in sections a cylindrical shell surface. At one end of the switch bushing 51, a base 53 is provided by which the switch bushing 51 is closed at one end. Opposite the base 53, the switch bushing 51 has a fastening section 54, preferably this fastening section 54 is formed as a circumferential collar or circumferential shoulder, which is directed outwards with respect to the core-tappet section 52.

This switching bushing 51 is preferably formed in one piece. In particular, this switching bushing 51 is formed as a deep-drawn part or a stamped-bent part from a blank. A core 37 is inserted in the core-tappet section 52. This core 37 is fixed in the switching bushing 51 by at least one circumferential bead 56. For this purpose, the core 37 has at least one circumferential recess so that the circumferential bead 56 can engage in the recess of the core 37. Thus, the core 37 is fixed in a simple manner within the switching bushing 51.

Furthermore, the tappet 35 is movably guided in the switching bushing 51. A return element 43 is provided between the tappet 35 and the core 37. At an end of the tappet 35 opposite the core 37, the closing body 33 is provided to engage the pilot bore 32 to form the pilot valve 31.

The switching bushing 51 has a length such that the core-tappet portion 52 extends at least through the opening 47 of the upper and lower legs 44, 45 of the yoke 39. Preferably, a portion of the switching bushing 51 is positioned to protrude with respect to the upper leg 44 of the yoke 39 so that the switching bushing 51 can be held fixed with respect to the path generating device 21 by a securing element 58.

The connection opening 19 of the valve housing 12 comprises at least one connection surface 20 with which a sealing element 61 is associated or which comprises, for example, an abutment surface and a circumferential recess, the sealing element 61 being positionable in the circumferential recess. The fastening section 54 of the switching bushing 51 abuts the connection surface 20 of the connection opening 19 after the path generation device 21 has been connected to the valve housing 12. Thus, sealing of the chamber 17 from the external environment can be achieved. Due to the integrally formed switching bushing 51, this one seal 61 is sufficient to seal an interface between the path generating device 21 and the valve housing 12. The path generating device 21 has a fastening section 54 on the yoke 39 or on a housing of the path generating device 21, so that via a releasable fastening element 63, such as a screw, clip or rivet, the path generating device 21 may be fixed to the valve housing 12. In addition to the fastening element 63, an anti-rotation device 62 may also be provided on the path generating device 21 or the valve housing 12 which allows and maintains alignment during arrangement.

The switching valve 11 shown in FIG. 1 is a so-called NC (Normally Closed) valve, which means that when the coil 38 is not energized, the switching valve 11 is closed and a passage between the supply opening and the discharge opening 14, 15 is blocked. Such a switching valve 11 uses, for example, a monostable path generating device 21 which holds only one position of the tappet 35 in an opening position as long as the coil 38 is energized.

In this switching valve 11, the valve piston 27 is guided in the chamber 17 of the valve housing 12. A pilot valve spring 30 is provided between the valve piston 27 and a through bore 23, which assists an opening movement of the valve piston 27 after the tappet 35 is actuated in an opening position.

In this embodiment of the switching valve 11 according to FIG. 1, the switching bushing 51 thus has a longitudinal extension so that the core 37 is accommodated therein and only the tappet 35 is movably guided.

FIG. 2 shows an alternative embodiment of the switching valve 11 to FIG. 1. This embodiment according to FIG. 2 differs from the embodiment in FIG. 1 in that a directly switched switching valve 11 is formed. In the embodiment according to FIG. 2, no movable pilot valve 31 is provided. Rather, the valve piston 27 is fixedly arranged in the valve housing 12, and the valve closing member 26 is directly provided on the tappet 35, which in the closing position 28 abuts the valve seat 24 and closes the through bore 23.

FIG. 3 shows an alternative embodiment of the switching valve 11 to FIG. 1. The switching valve 11 is again designed as an NC valve with a pilot valve 31. This switching valve 11 according to FIG. 3 is shown in an opening position. In this embodiment, the core-tappet section 52 extends into the connection opening 19 of the valve housing 12, so that the core 37 is fixed in the core-tappet section 52, the tappet 35 is movably guided and, in addition, the valve piston 27 of the pilot valve 31 is also guided. Thus, the guiding of the valve body 27 is shifted from the chamber 17 in the valve housing 12 according to FIG. 1 into the core-tappet section 52 of the switch bushing 51.

In this embodiment shown in FIG. 3, the valve housing 12 is formed in two parts. This allows the switching bushing 51 to be insertable into the connection opening 19 of the first housing half 66, with the sealing member 61 being provided between an outer periphery of the core-tappet section 52 and a connection surface 20 in the connection opening 19. Alternatively, the sealing element 61 may engage an outer surface of the fastening section 54 and a connection surface 20 in the connection opening 19. Arrangement of the switching valve 11 and the valve housing 12 is accomplished by an overhead arrangement. After inserting the switching bushing 51 into the connection opening 19 of the first housing half 66, the return element 43, the tappet 35 and the valve piston 27 are inserted into the switching bushing 51 and then the pilot valve spring 30 is fitted to the valve piston 27. Thereafter, the second half of the housing 67 is screwed in and fixed with the interposition of a further sealing element 61. This embodiment of the valve housing 12 may be provided, for example, to form a 90° corner valve.

The path generating device 21 may be attachable to the first half of the housing 66 of the valve housing 12 in a manner analogous to that described in FIG. 1.

FIG. 4 shows a schematic sectional view of an alternative embodiment of the switching valve 11 for a valve arrangement 10 to FIG. 1. In this embodiment, the switching bushing 51 is formed differently from the embodiment according to FIG. 1. Between the core-tappet section 52 and the fastening section 54, the switching bushing 51 comprises the guide section 55, which is preferably larger in diameter than the core-tappet section 52. The valve piston 27 is guided in this guide section 55. The fastening section 54 adjoining the guide section 55 is preferably formed in a stepped manner. A first shoulder 71 of the fastening section 54 serves as a holding-down surface, by means of which the switching bushing 51 is held fixed in the connection opening 19 of the valve housing 12 by means of the fastening element 63. Preferably, the fastening element 63 is pressed onto the guide section 55. Preferably, an end face of the fastening element 63 is positioned in abutment with the shoulder 71. At least by pressing the fastening element 63 onto the guide section 55, a tolerance compensation with respect to the roundness or cylindricity of the guide section 55 to the pilot valve 31 can be achieved. Advantageously, a radial distance difference between the guide section 55 and the valve pistons 27 can be achieved which is equal to or smaller than 0.1 times the radius of the guide diameter 55. The fastening element 63 has an external thread which engages on an internal thread in the connection opening 19. Complementarily, facing the shoulder 71, an annular collar is provided on the fastening element 63. A sealing element 61 is provided between a radial peripheral surface 72 of the fastening section 54, which adjoins the shoulder 71 and is preferably angled by 90°, and a cylindrical connection surface 20 of the outlet opening 19. This sealing element 61 may additionally be held down by the fastening element 63 and held fixed with respect to the circumferential collar, which is oriented radially outwards.

A contact surface 75 of the switching bushing 51 may additionally be provided on the radial peripheral surface 72, which contact surface 75 preferably points radially outwards and is, in particular, bevelled by 90°. By means of the fastening element 63, the switching bushing 51 can be fixed in the radial direction with respect to the valve housing 12, in that the latter engages on the shoulder 71 of the fastening section 54 and brings the contact surface 75 into contact in the connection opening 20. This connection opening 20 is sealed in the radial direction.

To assemble the path generating device 21 to the valve body 12, the return element 43 and subsequently the tappet 35 are inserted into the switching bushing 51. Complementarily, the valve piston 27 is inserted into the switching bushing 51. A pilot valve spring 30 is inserted into the chamber 17. Subsequently, the switching bushing 51 is positioned with the fastening section 54 in the connection opening 19. Before or after this, the sealing element 61 may be placed on the radial peripheral surface 72 of the switching bushing 51. Subsequently, the fastening element 63 is slipped over the switching bushing 51 as well as positioned towards the connection opening 19 and subsequently fixed. Subsequently, a damping element 74, in particular a rubber plate or a rubber washer, can be placed on the outer side 18 of the valve housing 12. This damping element 74 may also form the anti-rotation element. Thereafter, the path generating device 21 is placed on the switching bushing 51 and positioned with respect to the housing side 18. Via a securing element 58, the path generating device 21 may be held fixedly relative to the switching bushing 51. In this position, the damping element 74 may also act as an anti-rotation device. Alternatively, a securing element 62 may be provided in analogy to FIG. 1.

The switching valve 11 shown in FIG. 4 is an NC valve with a pilot valve 31.

FIG. 5 shows a schematic sectional view of a further alternative embodiment of the switching valve 11 for a valve arrangement 10 to FIG. 4. The structure of the path generation device 21 corresponds to the structure shown in FIG. 4, so that reference can be made to it.

Between the core-tappet section 52 and the fastening section 54, the switching bushing 51 includes the guide section 55 which is formed larger in diameter than the core-tappet section 52. The valve piston 27 is guided in this guide section 55. The fastening section 54 adjoining the guide section 55 is preferably formed in a stepped manner. The fastening section 54 comprises a first shoulder 71, which shoulder 71 serves as a holding-down surface through which the switching bushing 51 is held fixed in the connection opening 19 of the valve housing 12 by means of the fastening element 63. The fastening element 63 has an external thread which engages an internal thread of the connection opening 19. By means of the fastening element 63, the shoulder 71 of the fastening section 54 is held fixed to an connection surface 20 in the connection opening 19. This contact surface 20 is formed as an annular collar. Radially outside the connection surface 20, a circumferential depression in the form of a groove 73 is formed. A sealing element 61 is provided in this groove 73. Between the shoulder 71 and the groove 73, the sealing element 61 is held clamped by the fastening section 54.

The fastening section 54 further comprises a radial peripheral surface 72 adjacent the shoulder 71. This radial peripheral surface 72 may be supported by its end face in the groove 73. This radial peripheral surface 72 receives the sealing element 61. The sealing element 61 is held fixed in the groove 73 by the shoulder 71 and the radial peripheral surface 72 of the fixing portion 54.

The diameter of the through hole of the fastening element 63 is matched to the outer circumference of the guide section 55, so that the guide section 55 is insertable into the through hole of the fastening element 63 and preferably no clamping action or interference fit is obtained therebetween.

For assembling the valve arrangement 10, it is provided that after the switching bushing 51 has been made, the core 37 is inserted into the switching bushing 51 and fixed in place by the circumferential bead 56. Subsequently, the return element 43 and the tappet 35 are inserted into the switching bushing 51. The opening of the switching bushing 51 is oriented upwards. In addition, the valve piston 27 is inserted into the switch bushing 51. Subsequently, the pilot valve spring 30 is positioned relative to the valve piston 27. Subsequently, the sealing element 61 is placed on an inner side of the mounting section 54. Subsequently, the valve body 12 is positioned to rest on the sealing member 61 and the valve piston 27 with the pilot valve spring 30 interposed. In a subsequent step, the fastening element 63 is slipped over the switching bushing 51 and positioned and fixed to the connection opening 19 in the valve housing 12. Subsequently, this pre-assembled arrangement comprising the switching bushing 51 and the valve housing 12 can be rotated 180° so that subsequently, if necessary, the damping element 74 is placed on the outer side 18 of the valve housing 12 from above. Subsequently, the path generating device 21 can be placed on the switching bushing 51 and held fixed by the securing element 58 to the switching bushing 51. Alternatively to the securing element 58, the path generating device 21 can be fixed to the valve housing 12 by the releasable fastening element 63, which is preferably insertable into an opening in the yoke 39. The securing element 58 may be omitted, and the protrusion of the bottom 53 of the switching bushing 51 from the upper leg 44 of the yoke 39 may be reduced or eliminated. In this arrangement, the damping element 74 may also act as an anti-rotation device. Alternatively, a securing element 62 may be provided in analogy to FIG. 1.

The switching valve 11 shown in FIG. 5 is an NC valve with a pilot valve.

FIG. 6 shows an alternative embodiment of the valve arrangement 10 to FIG. 4. In this embodiment, the switch bushing 51 comprises the core-tappet section 52 as well as the guide section 55 for the valve piston 27 of the pilot valve 31. The mounting section 54 adjoins the guide section 55 and is formed as a circumferential collar which is angled outwardly by 90° relative to a longitudinal axis of the switching bushing 51. The connection surface 20 in the connection opening 19 is radially aligned with the longitudinal axis of the switch bushing 51 and the longitudinal axis of the through bore 23, respectively. There is a circumferential groove 73 in the connection surface 20 for receiving the sealing element 61. In analogy to FIG. 4, the switching bushing 41 is fitted in an overhead arrangement with the actuating element 43, the tappet 35, the valve piston 27 and then the pilot valve spring 30. The sealing element 61 is then placed on the fastening section 54, and the valve body is positioned with the connection surface 20 facing the switching bushing 51. This pre-assembled arrangement is then rotated 180° so that the control bushing is positioned upwards, as shown in FIG. 5. Next, a spacer ring 76 is positioned in the connection opening 20, which rests on the fastening section 54. Subsequently, the path generating device 21 is placed on the switching bushing 51 so that a lower leg 45 of the yoke 39 rests on the spacer ring 76. On the lower leg 45 of the yoke 39, fastening elements 63 are given at a distance from each other, which are detachably connected to the valve housing 12. This allows the path generating device 21 to be held fixed to the housing side 18 of the valve housing 12, wherein when the fastening element 63 is fastened, a tightening or clamping action is exerted on the seal 61 via the fastening portion 54 of the switching bushing 51 to seal the interface between the valve housing 12 and on the switching valve 11.

This switching valve 11 is an NC valve with a pilot valve.

FIG. 7 shows an alternative embodiment for attaching the switching valve 11 to the valve housing 12 for a valve arrangement 10 to FIG. 6. This embodiment according to FIG. 7 comprises a switching bushing 51 which corresponds to that in FIG. 6. The arrangement of the sealing element 61 also corresponds to the embodiment according to FIG. 6. In the embodiment according to FIG. 7, in deviation from FIG. 6, the mounting of the switching bushing 51 to the connection opening 19 in the valve housing 12 is effected via a flange 78. This flange 78 can be designed as a flange plate which can be fastened to the housing side 18 of the valve housing 12 by detachable fastening elements 63. The flange 78 may hold down a spacer ring 76 previously fitted to the switching bushing 51. Alternatively, the spacer ring 76 and the flange 78 may be one piece. Due to the attachment of the switching bushing 51 via the flange 78, the yoke 39 of the path generating device 21 may be formed without an attachment portion.

The switching valve 11 shown in FIG. 7 is an NC valve with a pilot valve.

FIG. 8 shows a further alternative embodiment of the switching valve 11 for a valve arrangement 10 to FIG. 6. In this embodiment as shown in FIG. 8, the design of the switching bushing 51 corresponds to the embodiment as shown in FIG. 6. The path generating device 21 differs from that shown in FIG. 6. In this embodiment of the path generating device 21, the coil 38 and the yoke 39 are incorporated in a housing 22. In particular, the housing 22 is formed by overmolding the coil 38 and the yoke 39. The housing 22 of the path generating device 21 includes a connection section 81 which is insertable into the connection opening 19 of the valve housing 12. The sealing member 61 is positioned between the connection section 81 and the fastening section 54 of the switching bushing 51. The connection section 81 comprises an annular collar by which the sealing element 61 is held down, on the one hand, in the direction of the fastening section 54 of the switching bushing 51 and, on the other hand, in the direction of the cylindrical connection surface 20 in the connection opening 19. A fastening section 54 is provided on the housing 22 of the path generating device 21, by which the at least one element 63 is detachably connected to the valve housing 12. The fixing and sealing arrangement is achieved by fixing the housing 22 to the valve housing 12 via the releasable fastening element 63.

This switching valve 11 is designed as an NC valve with a pilot valve 31.

FIG. 9 shows a schematic sectional view of an alternative embodiment of the switching valve 11 to FIG. 4. This embodiment differs from FIG. 4 in that the switching valve 11 is now designed as a directly switched NC valve instead of an NC valve with a pilot valve 31. In this embodiment, the valve piston 27 is fixedly connected to the valve housing 12. As a result, the tappet 35 exclusively controls an opening and closing of the through bore 23, which preferably corresponds to the pilot hole 32.

The design of the switching bushing 51 as well as its attachment and the mounting of the path generation device 21 correspond to the embodiment shown in FIG. 4.

FIG. 10 shows another alternative embodiment of the switching valve to FIG. 6. In this embodiment according to FIG. 10, the switching valve 11 is designed as an NO valve with a pilot valve 31. In such an NO valve, the arrangement and construction of the core 37 and the coil 38 are different from the arrangement according to the NC valve in FIG. 6.

The core 37 is positioned adjacent the guide section 55 and within the core-tappet section 52, and in turn is fixed within the core-tappet section 52 by a circumferential bead 56. Between the core 37 and the base 53 of the switching bushing 51, the tappet 35 is movably guided. This tappet 35 may include a closing body 33 which extends through the core 37 and closes the pilot bore 32 upon actuation of the path generating device 21. Provided that the path generating device 21 is not energized, the tappet 35 is arranged in a lifted position or in an open position with respect to the pilot valve 31 so that the pilot bore 32 is open.

In the embodiment, the tappet 35 is formed in two parts and includes a movable tappet body 84 and a guide pin 86 slidably mounted in the movable tappet body 84. A damping spring 85 is mounted within the movable tappet body 84 and acts on the guide pin 86, which is slidably mounted in the movable tappet body 84. When the path generating device 21 is energized, the movable tappet body 84 of the tappet 35 is moved toward the core 37. Once the guide pin 86 rests on the pilot bore 32, a further driving movement of the movable tappet body 84 towards the core 37 may cause a decoupling between the movable tappet body 84 and the guide pin 86. An entraining shoulder 87 is provided at an end of the guide pin 86 lying in the tappet 35, by means of which the guide pin 86 is transferred into an opening position 29, provided that the path generating device 21 is de-energized, since the return element 43 transfers the tappet 35 into an opening position 29.

FIG. 11 shows another alternative embodiment of a switching valve 11 as an NO valve with a pilot valve 31. The operation and construction of the switching valve 11 according to this form corresponds to the embodiment according to FIG. 10. Reference is made directly to this.

In this embodiment according to FIG. 11, the design of the switching bushing 51 and the fixing of the switching valve 11 to the valve housing 12 is different from the embodiment in FIG. 10.

The switching valve 11 comprises the switching bushing 51, the core-tappet section 52 and, opposite the base 53, the guide section 55. This guide section 55 is enlarged in diameter compared with the core-tappet section 52. Adjacent to this guide section 55, opposite the base 53, is the fastening section 54, to which a shoulder 71 and then a radial peripheral surface 72 extend towards the open side of the switching bushing 51.

The connection opening 19 in the valve body 12 includes a connection surface 20 on which the fastening section 54 rests. The connection surface 20 includes a circumferential groove 73 provided radially outwardly circumferentially of the connection surface 20. The fastening section 54 of the switching bushing 51 extends into the radially peripheral surface 72 of the switching bushing 51. In this radially circumferential groove 73, the sealing member 61 is further provided which, on the one hand, engages an outer circumferential surface of the groove 73 and, on the other hand, abuts an outer circumferential surface of the radially peripheral surface 72 of the fastening section 54. The releasable fastening element 63 is screwed into the connection opening 19, so that the switching bushing 51 is held fixed in the valve housing 12 over the fastening section 54. A radial seal between the valve arrangement 11 and the valve housing 12 occurs for the sealing element 61 in the circumferential groove 73.

The path generating device 21 may be fixed to the valve body 12 by a further releasable fastening element 63, which preferably engages the yoke 39 of the path generating device 21. Alternatively, the securing element 58 may fix the path generating device 21 to the switching bushing 51.

The above-described embodiments of the switching bushing 51 are applicable to both an NO valve and an NC valve.

FIG. 12 shows a schematic sectional view of an alternative embodiment of the switching valve 11 to FIG. 11. This switching valve 11 according to FIG. 12 is designed as a directly switched NO valve. In this embodiment—as in FIG. 9—the valve piston 27 is firmly connected to the valve housing 12. As a result, the tappet 35 exclusively controls an opening and closing of the through bore 32, which preferably corresponds to the pilot bore 32. The design of the switching bushing 51 as well as its attachment and the mounting of the path generating device 21 to the valve housing 12 corresponds to the embodiment according to FIG. 11.

The construction of the path generating device 21 according to FIG. 12 corresponds to the construction in FIG. 10 or 11 with the exception that the pilot valve 31 is not guided axially displaceably in the guide section 55 of the switching bushing 51. Instead of the movable pilot valve 31 of FIG. 11, the valve piston 27 is fixedly provided in the valve housing 12. An annular collar of the valve piston 27 facing the core 37 of the path generating device 21 is positioned in the guide section 55 of the switching bushing 51. This annular collar of the valve piston 27 has laterally open through channels or through holes, so that the refrigerant can flow from the supply opening 14 into the chamber 17 and from there via the pilot bore 32 to the discharge opening 15.

The guide pin 46 of the path generating device 21 has, at its end facing to the valve piston 27, a closing body 33 which, when the path generating device 21 is actuated, bears against the valve seat 24 of the valve piston 27 and closes the pilot bore 32—that is, the through bore 32.

FIG. 13 shows a schematic sectional view of an alternative embodiment of a switching valve 11 to the embodiment in FIG. 10. The switching valve 11 in FIG. 13 is designed as an NO valve with a pilot valve 31 and corresponds to the embodiment in FIG. 10.

In contrast to FIG. 10, in this embodiment the valve housing 12 is a valve housing of an expansion valve 91. This valve housing 12 may be formed as a two-way housing or a four-way housing for an expansion valve 91. In the embodiment example, a four-way expansion housing is shown. Between a feed opening 14 and a discharge opening 15, a regulating opening 92 is provided which comprises a valve seat 93 with which a valve ball 94 is associated and which, in a closed position, closes the valve seat 93. Via an actuating device 96, which preferably comprises a thermal head, a transfer pin 97 is actuated which acts on the valve ball 94 and can transfer it to an open position. This allows the refrigerant to flow from the feed opening 14 to the discharge opening 15, and additionally to expand at the regulating opening 94. The valve ball 94 is provided on a regulating device 98, which comprises at least one regulating spring 99 accommodated in a regulating housing 101. This regulating housing 101 is insertable, in particular screwable, into the valve housing 12. The regulating housing 101 comprises a connection opening 19, in which the switching valve 11 is insertable. This connection opening 19 corresponds to the embodiments described above, wherein the connection opening 19 is provided in the regulating housing 101. Centrally provided in the regulating housing 101 is the through bore 23, which opens into a regulating chamber 102 in which the valve ball 94 is positioned. In the embodiment example, the regulating device 96 is arranged on the high pressure side. Alternatively, this can also be arranged on the low-pressure side, i.e. downstream of the valve opening 93. In all other respects, reference is made in full to DE 10 2004 049 790 A1 for the embodiment of such an expansion valve.

The foregoing embodiments show that the switching bushing 51 for the switching valve 11 can be used with either a "Normally Open" or "Normally Closed" switching function and/or with a directly switched switching valve 11 or a switching valve 11 switched with a pilot valve.

The invention claimed is:

1. A valve arrangement for controlling a mass flow in a refrigeration circuit or heating circuit, comprising:
    a valve housing, which has a feed opening and a discharge opening and a through bore provided therebetween, on which a valve seat is provided,
    a switching valve comprising
       a path generating device comprising a U-shaped yoke with upper and lower legs aligned with each other and a coil positioned within the yoke which is electrically controllable,
       a core fixedly positioned relative to the coil, which the core protrudes at least with a portion relative to the coil and is positioned in an opening of the leg of the yoke, and
       a tappet provided in the coil, which the tappet is movable relative to the core and can be passed with one end through an opening in one of the legs of the yoke,
       a closing body or valve closing member arranged on the tappet, which is controllable by a path-generating device and in a closing position bears against the valve seat or in a pilot bore of a valve piston and closes the through-bore, and
       a return element which is arranged between the core and the tappet,
    wherein a switching bushing is provided which is insertable into the path-generating device, and the switching bushing is closed on one end by a base and is open on the opposite end of the base and a fastening section is assigned to the open end of the switching bushing, and
    the switching bushing has a core-tappet section with a cylindrical lateral surface extending between the base and the fastening section, in which at least the core is received and the tappet is guided, and
    the fastening section opposite the base has at least one circumferential shoulder or circumferential collar directed outwardly relative to the core-tappet section,
    the switching valve, which is fastened with the fastening section of the switching bushing on or in the valve housing, and
    the path generating device is fixed to the valve housing by at least one releasable fastening element which engages outside a connection opening on or in the valve housing towards which the switching bushing is aligned.

2. The switching valve of claim 1, wherein the switching bushing extends through the opening of the upper and lower legs of the yoke and through the coil.

3. The switching valve according to claim 1, wherein the base of the switching bushing protrudes opposite an outer side of the upper or lower leg of the yoke and this protruding portion of the switching bushing is held fixed to the yoke by a securing element.

4. The switching valve according to claim 1, wherein the core-tappet section for guiding the tappet movable therein has a constant diameter.

5. The switching valve according to claim 1, wherein the switching bushing has at least one widened guide section between the core-tappet section and a mounting portion for receiving a pilot valve.

6. The switching valve according to claim 5, wherein an inner diameter of the guide section is formed with clearance to the outer periphery of the pilot valve.

7. The switching valve according to claim 1, wherein the fastening element is pressed onto a guide section of the switching bushing and rests against the shoulder or the collar of the switching bushing.

8. The switching valve according to claim 1, wherein the fastening section has a radial peripheral surface adjoining at least the shoulder and a further contact surface is provided on the radial peripheral surface.

9. The switching valve according to claim 1, wherein at least the base, the core-tappet section and the fastening section of the switching bushing are formed integrally.

10. The switching valve according to claim 1, wherein the switching bushing comprising at least the base, the core-tappet section and the fastening section is formed as a deep-drawn part or as a stamped-bent part.

11. The valve arrangement according to claim 1, wherein the fastening section of the switching bushing of the switching valve is positioned at or in a connection opening of the valve housing and at least one sealing element is positioned between a connection surface of the connection opening and the fastening section.

12. The valve arrangement according to claim 1, wherein the path generating device is connected to the valve housing by at least one releasable fastening element positioned between the yoke of the path generating device and a fastening section of the switch bushing.

13. The valve arrangement according to claim 12, wherein the releasable fastening element is designed as a screw bushing which engages in an internal thread in the connection opening, or in that the releasable fastening element is designed as a flange which is connectable to the valve housing outside the connection opening or in that the releasable fastening element is designed as a screw which fixes the yoke of the path-generating device to the housing.

14. The valve arrangement according to claim 13, wherein the releasable fastening element is designed as a screw bushing which engages in an internal thread in the connection opening and is pressed onto a guide section of the switch bushing.

15. The valve arrangement according to claim 1, wherein the switching bushing of the switching valve is insertable in a connection opening of a first housing half of the valve housing and is fixed to a second housing half of the valve housing with respect to the first housing half.

16. The valve arrangement according to claim 1, wherein the switching valve is designed as a direct-switching valve, in which the tappet bears with the valve closing member directly against the valve seat in a closed position.

17. The valve arrangement according to claim 1, wherein the switching valve comprises a pilot valve arranged between the tappet and the valve seat on the through bore and wherein a valve piston of the pilot valve is guided in the switching bushing or in the connection opening of the valve housing.

18. The valve arrangement according to claim 1, wherein the switching valve is configured as a normally closed (NC) valve or as a normally open (NO) valve.

* * * * *